(12) United States Patent
Wagner et al.

(10) Patent No.: US 7,876,501 B2
(45) Date of Patent: *Jan. 25, 2011

(54) OPTICAL SIGHT HAVING AN UNPOWERED RETICLE ILLUMINATION SOURCE

(75) Inventors: Kevin B. Wagner, Wyevale (CA); Brien Douglas Ross, Wyevale (CA)

(73) Assignee: Raytheon Company, Waltham, MA (US)

( * ) Notice: Subject to any disclaimer, the term of this patent is extended or adjusted under 35 U.S.C. 154(b) by 405 days.

This patent is subject to a terminal disclaimer.

(21) Appl. No.: 11/702,685

(22) Filed: Feb. 5, 2007

(65) Prior Publication Data

US 2008/0186484 A1 Aug. 7, 2008

(51) Int. Cl.
*G02B 23/02* (2006.01)

(52) U.S. Cl. .................................. 359/428; 359/424

(58) Field of Classification Search ................. 359/427, 359/428, 424, 397
See application file for complete search history.

(56) References Cited

U.S. PATENT DOCUMENTS

| | | | |
|---|---|---|---|
| 3,961,344 A * | 6/1976 | Baisch et al. | ............... 396/378 |
| 4,030,203 A | 6/1977 | Ackerman | |
| 4,533,980 A | 8/1985 | Hayes | |
| 4,743,765 A | 5/1988 | Ekstrand | |
| 4,877,324 A | 10/1989 | Hauri | |
| RE35,347 E | 10/1996 | Bindon | |
| 5,653,034 A | 8/1997 | Bindon | |
| 5,924,234 A | 7/1999 | Bindon et al. | |
| 5,946,132 A | 8/1999 | Phillips | |
| 6,807,742 B2 | 10/2004 | Schick et al. | |
| 7,051,469 B1 | 5/2006 | Pochapsky et al. | |
| 7,355,790 B1 * | 4/2008 | Wagner et al. | ............... 359/424 |
| 7,652,818 B2 * | 1/2010 | Wagner et al. | ............... 359/428 |
| 2006/0279964 A1 * | 12/2006 | Kitamura | .................... 362/620 |
| 2006/0291849 A1 * | 12/2006 | Shamir et al. | ............... 396/334 |

* cited by examiner

*Primary Examiner*—Joshua L Pritchett
(74) *Attorney, Agent, or Firm*—Lyudmila Lubashev; Saint St. Julian

(57) ABSTRACT

An optical sight includes an optical train having an optical path therethrough, an entrance, and an exit. A reticle is visible through the exit of the optical path. An unpowered reticle illumination source has a first light source that illuminates the reticle responsive to the level of ambient light, and a second light source that illuminates the reticle with an unpowered light source. The reticle illumination source preferably has a light filter positioned so that ambient light entering the ambient-light receiver is incident upon the light filter, whereupon the light filter transmits filtered light, a light-gathering prism that receives the filtered light and has a diffusing surface disposed to illuminate the reticle using the filtered light, and an unpowered light source positioned to emit light through the diffusing surface to be incident upon the reticle. The unpowered light source may be a tritium light source.

21 Claims, 2 Drawing Sheets

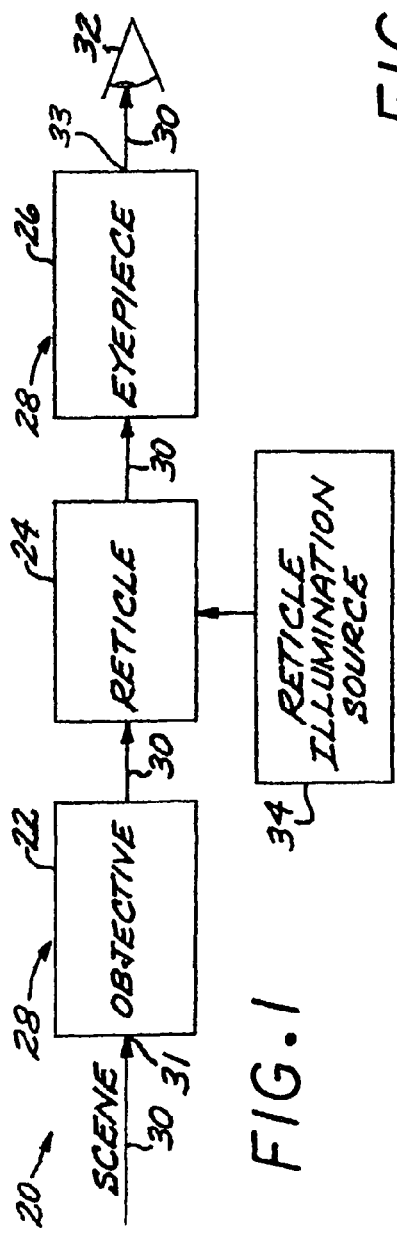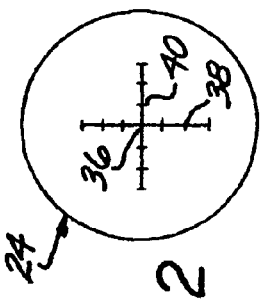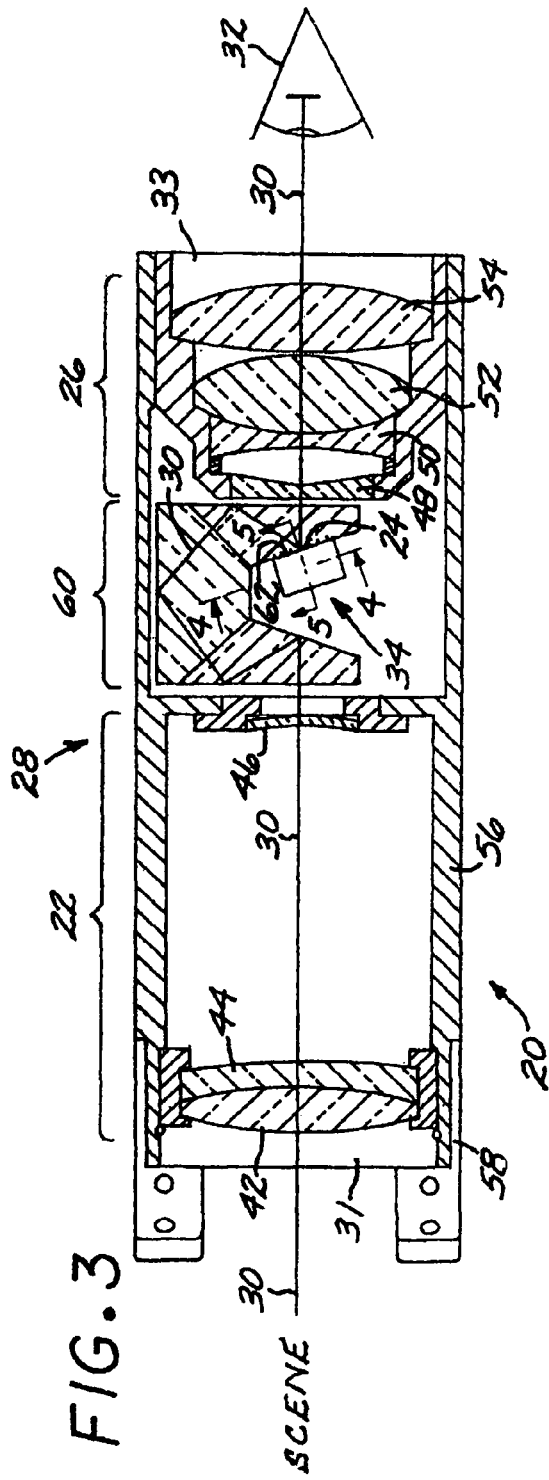

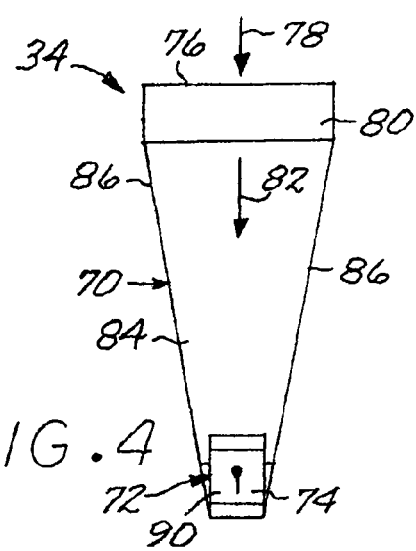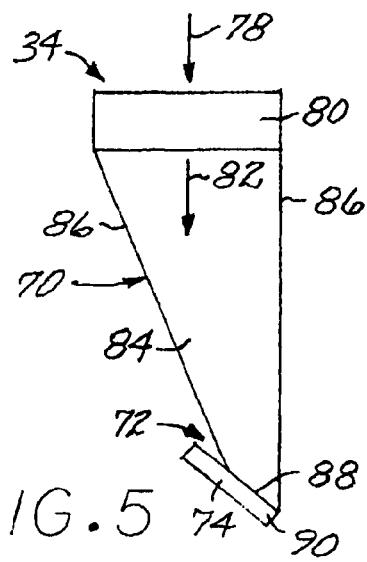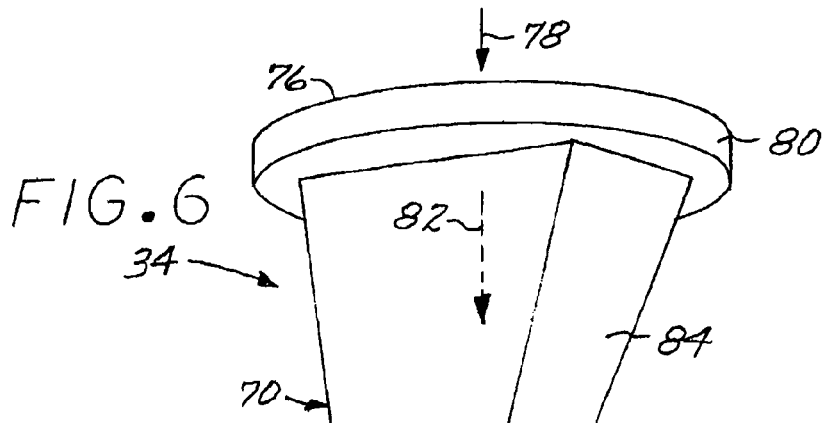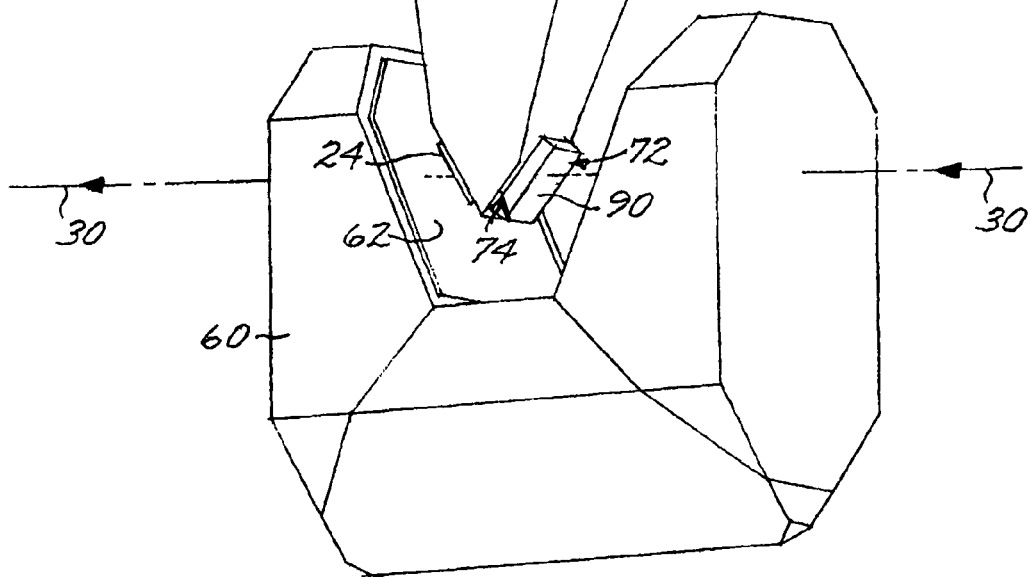

OPTICAL SIGHT HAVING AN UNPOWERED RETICLE ILLUMINATION SOURCE

This invention relates to an optical sight, and more particularly to the optical sight in which the reticle is illuminated by a reticle illumination source that requires no power supply.

BACKGROUND OF THE INVENTION

Refractive or reflective optical sights are used in a wide variety of applications to obtain increased magnification of a scene. In one common application, an optical sight is affixed to the upper side of the barrel of a rifle-type weapon used by a soldier or a hunter. The user sights through the optical sight to acquire a target and aim the weapon toward the target to increase the likelihood of hitting the target with a projectile fired from the weapon.

A reticle is typically provided in the optical path of the optical sight to aid the user of the weapon in aiming the weapon. The reticle normally has reference markings or other information that aids the user in aiming the optical sight and thence the weapon toward the intended target. The reference markings usually include a cross hair, bulls-eye, center dot, or similar marking to indicate the bore sight of the weapon. The reference markings may also include elevation, windage, and other reference markings that assist the user in aiming the weapon.

The reticle must be visible to the user of the optical sight. In some designs, the reticle is illuminated by an artificial light source within the optical sight. The use of reticle illumination adds cost and weight, but it ensures that the reticle will be visible in a wide range of lighting conditions including normal daylight, low-light ambient conditions, and near-darkness conditions.

There is a need for an improved approach to ensure proper illumination of the reticle of an optical sight, so that the reticle always remains visible to the user peering through the optical sight. The present invention fulfills this need, and further provides related advantages.

SUMMARY OF THE INVENTION

The present approach provides an optical sight with an illuminated reticle. The illuminated reticle is suitable for both day and night use. The present approach uses unpowered reticle illumination, thereby avoiding the need for a power supply that must be periodically replaced, avoiding the need for a powered light source such as an incandescent source or a light-emitting diode that may fail, and avoiding the need for interconnections and circuitry. The elements of a powered reticle illumination source for the reticle also add weight and cost to the optical sight, which are avoided by the present approach.

In accordance with the invention, an optical sight comprises an optical train having an optical path therethrough, an entrance, and an exit. The optical sight further includes a reticle visible through the exit of the optical path, and an unpowered reticle illumination source. The unpowered reticle illumination source has a first light source that illuminates the reticle responsive to the level of ambient light, and a second light source that illuminates the reticle with an unpowered light source. The first light source comprises a light filter.

The first light source also preferably comprises a light-gathering prism. In one embodiment, the first light source comprises an ambient-light receiver, a light filter positioned so that ambient light entering the ambient-light receiver is incident upon the filter, whereupon the light filter transmits filtered light, and a light-gathering prism that receives the filtered light and has a diffusing surface disposed to illuminate the reticle using the filtered light. The second light source preferably comprises a tritium light source.

In a preferred embodiment, then, the reticle illumination source comprises a light filter positioned so that ambient light entering the ambient-light receiver is incident upon the light filter and the light filter transmits filtered light. There is a light-gathering prism that receives the filtered light and has a diffusing surface disposed to illuminate the reticle using the filtered light. An unpowered light source is positioned to emit light through the diffusing surface to be incident upon the reticle.

The optical train preferably comprises an optically powered objective, and an optically powered eyepiece. The optically powered objective typically has at least one objective lens, and the optically powered eyepiece typically has at least one eyepiece lens. The reticle may be formed in any operable manner. For example, the reticle may be formed on the eyepiece lens. The optical train may include an image erector having a reflective surface thereon, and the reticle is formed on the reflective surface of the image erector. The reticle may instead be freestanding.

Thus, in a particularly preferred embodiment, an optical sight comprises an optical train having an optical path therethrough. The optical train comprises an optically powered objective having at least one objective lens, and an optically powered eyepiece having at least one eyepiece lens. There is a reticle coincident with the optical path, and an unpowered reticle illumination source. The unpowered reticle illumination source includes an ambient-light receiver, a light filter positioned so that ambient light entering the ambient-light receiver is incident upon the light filter and the light filter transmits filtered light, a light-gathering prism that receives the filtered light and has a diffusing surface disposed to illuminate the reticle using reflected filtered light, and an unpowered tritium light source positioned to emit light through the diffusing surface to be incident upon the reticle.

During daylight use of the optical sight, the reticle is illuminated primarily by the available ambient light of the first light source. The filtered light is of a selected wavelength. The second light source, preferably the tritium light source, provides the primary reticle illumination when ambient light is low, as during twilight or night use of the optical scope. The second light source is always in operation, but illumination of the reticle is dominated by the primary, ambient, light source during periods of good ambient light.

The present approach has the important advantage that no power source is present for reticle illumination. Combat operations have shown that failure of the reticle illumination is of serious concern, because failure of the reticle illumination greatly diminishes the usefulness of the optical sight. Such failures can result from a wide variety of causes, including apparatus-based failures such as battery failure, light-source failure, switch failure, and wiring failure, or externally caused failures such as damage caused to the device by enemy action, impacts caused by falls, and the like. The present approach avoids the possibility of many of these failure mechanisms, thereby improving the reliability of the optical sight and the weapon system. The cost, volume increase, and weight increase associated with the powered illumination are also avoided.

The present approach provides a day/twilight/night optical sight with reticle illumination that does not require power. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block diagram of an optical sight;

FIG. 2 is a front elevational depiction of a reticle;

FIG. 3 is a sectional view of a portion of a physical embodiment of the optical sight of FIG. 1;

FIG. 4 is a sectional view of a portion of the embodiment of FIG. 3, taken on line 4-4, illustrating the unpowered reticle illumination source;

FIG. 5 is a sectional view of a portion of the embodiment of FIG. 3, taken on line 5-5, illustrating the unpowered reticle illumination source; and FIG. 6 is a perspective view, from the reverse angle as compared with the view of FIG. 5, of an unpowered reticle illumination source functioning with a reticle.

DETAILED DESCRIPTION OF THE INVENTION

FIG. 1 depicts in general form an optical sight 20 according to the present approach. The optical sight 20 includes an optically powered objective 22, a reticle 24, and an optically powered eyepiece 26. Each of the objective 22 and the eyepiece 26 preferably includes one or more optically powered lenses. The objective 22 and the eyepiece 26 together constitute an optical train 28 with an optical path 30 therethrough. Light travels along the optical path 30 from a scene to an entrance 31 of the objective 22, through the objective 22, from the objective 22 to the eyepiece 26, and from an exit 33 of the eyepiece 26 to an eye 32 of the user of the optical sight. The reticle 24 is superimposed upon and coincident with the optical path 30 at some point, normally between the objective 22 and the eyepiece 26, before the optical path enters the eye 32 of the user. The reticle 24 is illuminated by an unpowered reticle illumination source 34. ("Unpowered" as used herein in relation to an illumination source means that the illumination source uses no power source such as a battery or line electrical power.)

The reticle 24 is a pattern of markings that provide a spatial reference for the user relative to the scene and to the optical sight 20. FIG. 2 is an example of a reticle 24. There is typically a boresight marking 36, such as a cross hair, and there may be other markings such as elevation markings 38 and/or windage markings 40. Optionally, other information may be permanently or temporarily displayed in the reticle 24. The reticle 24 may be a freestanding element, or it may be defined on a surface through which the optical path 30 passes or from which the optical path 30 is reflected. When the reticle 24 is defined on a surface, it is typically formed on that surface by etching or engraving. The reticle 24 may be positioned between the objective 22 and the eyepiece 26 as illustrated, or may be positioned between or upon some of the individual elements of the objective 22 or the eyepiece 26. In any event, the reticle 24 is visible to the eye 32 of the user of the optical sight 20 through the exit 33 of the optical path 30. The presently preferred embodiment is a reticle defined on a surface from which the optical path 30 reflects, and that embodiment will be described in detail.

FIG. 3 depicts such a preferred embodiment of the optical sight 20. Previously described elements are indicated, and the prior description is incorporated. The objective 22 includes three optically powered objective lenses 42, 44, and 46, with lenses 42 and 44 a cemented doublet. The objective lenses 42, 44, and 46 combine to provide an optical power to the objective 22. The eyepiece 26 includes four optically powered eyepiece lenses 48, 50, 52, and 54. The eyepiece lenses 48, 50, 52, and 54 combine to provide an optical power to the eyepiece 26. This arrangement of the lenses for the objective 22 and the eyepiece 26 is illustrative and not limiting. Other types of objectives 22 and eyepieces 26 may be used. All of the elements are enclosed in a housing 56, which has an attachment 58 for attaching the housing 56 to a rifle or other structure (not shown) that is to be aimed with the assistance of the optical sight 20.

The objective 22 inverts the image from the scene as it travels along the optical path 30. To re-invert the image so that it may be comfortably viewed by the user without changing the magnification of the image, an optically unpowered image erector prism 60 is positioned on the optical path 30 between the objective 22 and the eyepiece 26. The image erector prism 60 includes mirror surfaces provided as three prism elements, and the optical path 30 is reflected from reflecting surfaces of the image erector prism 60 as it passes through the image erector prism 60 as illustrated in FIG. 3. The optical path 30 leaves the image erector prism 60 on its way to the eyepiece 26 after reflecting from a final reflecting surface 62.

In the embodiment illustrated in FIGS. 4-6, the reticle 24 is formed on the final reflecting surface 62 of the image erector prism 60, preferably by etching or engraving. That is, the reticle 24 is a pattern of lines or other features on the final reflecting surface 62 of the image erector prism 60.

The unpowered reticle illumination source 34 illuminates the reticle 24. FIGS. 4-6 illustrate a preferred embodiment of the unpowered reticle illumination source 34 in greater detail.

The unpowered reticle illumination source 34 includes a first light source 70 that illuminates the reticle 24 responsive to the level of ambient light, and a second light source 72 that illuminates the reticle 24 with an unpowered light source 74 that is not responsive to, or dependent upon, the level of ambient light. Neither the first light source 70 nor the second light source 72 uses or requires any power or power supply.

The first light source 70 includes an ambient-light receiver 76, which is preferably an opening or window to the external environment. Ambient visible light 78 enters the ambient-light receiver 76. A light filter 80 is positioned so that the ambient light 78 entering the ambient-light receiver 76 is incident upon the light filter 80. The light filter 80 transmits filtered light 82. A wide range of light filters for ambient light 78 are known for other applications, and any such operable light filter may be used. The selection of the light filter 80 determines the color of the light that illuminates the reticle 24 from the first light source 70.

A light-gathering prism 84 receives the filtered light 82 from the light filter 80. The light-gathering prism has multiple sides that form multiple reflective surfaces 86 that reflect the filtered light 82 in multiple paths toward the opposite end of the light-gathering prism 84. The reflective surfaces 86 are formed as polished surfaces that may be externally silvered, and which achieve internal reflection to confine the filtered light 82 to the interior of the light-gathering prism 84. At the opposite end of the light-gathering prism 84 from the light filter 80 is a diffusing surface 88 that is disposed to illuminate the reticle 24 using the filtered light 82. The diffusing surface 88 is formed by an approach such as grinding, etching, sandblasting, or glass-shot blasting. Fine grinding is preferred. The diffusing surface 88 increases the uniformity of the light that eventually reaches the reticle 24.

The second light source 72, the unpowered light source 74, preferably is a tritium light source 90. Tritium light sources 90 are known for other applications. Generally, the tritium light source 90 includes a hollow, transparent capsule having a phosphorescent material coated onto the inside surface of the capsule. The interior of the capsule is filled with radioactive tritium gas. Beta particles emitted by the tritium gas cause the phosphorescent material coating to fluoresce, producing an emitted light. This emitted light passes through the diffusing surface 88 and is incident upon the reticle 24. The second light source 72 operates constantly.

When the ambient light 78 is of a high intensity, the first light source 70 provides the major part of the illumination for the reticle 24, although the second light source 72 continues to operate and supply the minor part of the illumination for the reticle 24. When the ambient light 78 is of a low intensity, the second light source 70 provides the major part of the illumination for the reticle 24, although there may be some illumination of the reticle 24 provided by whatever ambient light 78 is available.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical sight comprising:
    an optical train having an optical path therethrough, an entrance, and an exit;
    a reticle visible through the exit of the optical path; and
    a reticle illumination source having
        a first light source that illuminates the reticle responsive to a level of ambient light, wherein the first light source comprises a light-gathering prism, wherein said prism has multiple sides including a first input side adapted to receive ambient light, an output side adapted to output said light toward said reticle, and a plurality of reflective sides adapted to internally reflect said light within said prism, and
        a second light source that illuminates the reticle with a light source that is not dependent on ambient light.

2. The optical sight of claim 1, wherein the first light source further includes an optical filter adapted to filter said ambient light such that a desired color of light illuminates said reticle from said first light source.

3. The optical sight of claim 1, wherein
    the light-gathering prism further includes a second input side adapted to transmit light from said second light source through said prism toward said output side to illuminate the reticle.

4. The optical sight of claim 3, wherein
    said second input side includes a diffusing surface adapted to diffuse light from within said prism such that said light is redirected toward said output side to illuminate the reticle, and
    said second light source is positioned to emit light through the diffusing surface to be incident upon the reticle.

5. The optical sight of claim 1, wherein the second light source comprises a tritium light source.

6. The optical sight of claim 1, wherein the optical train comprises
    an optically powered objective, and
    an optically powered eyepiece.

7. The optical sight of claim 1, wherein the optical train comprises
    an optically powered objective having at least one objective lens, and
    an optically powered eyepiece having at least one eyepiece lens.

8. The optical sight of claim 1, wherein the optical train comprises
    an optically powered objective having at least one objective lens, and
    an optically powered eyepiece having at least one eyepiece lens, and wherein the reticle is formed on the eyepiece lens.

9. The optical sight of claim 1, wherein the optical train comprises
    an image erector having a reflective surface thereon, and wherein the reticle is formed on the reflective surface of the image erector.

10. The optical sight of claim 1, wherein the plurality of reflective sides are adapted to internally reflect said received ambient light in multiple paths toward said output side such that said light is substantially confined within said prism until exiting through said output.

11. The optical sight of claim 1, wherein the light-gathering prism further includes a diffusing surface adapted to redirect said received light toward said reticle.

12. The optical sight of claim 11, wherein said diffusing surface is also adapted to transmit light from said second source toward said reticle.

13. The optical sight of claim 11, wherein said diffusing surface is formed by roughening a side of said prism.

14. The optical sight of claim 1, wherein said optical sight further includes a housing for housing said optical train and reticle illumination source, said housing including a window adapted to transmit light from an external environment to said light-gathering prism.

15. An optical sight comprising:
    an optical train having an optical path therethrough;
    a reticle coincident with the optical path;
    a housing for housing said optical train; and
    a reticle illumination source comprising
        a window in said housing adapted to transmit ambient light from outside of said housing to an interior of said housing,
        a first light source including a light-gathering prism disposed within said housing and positioned to receive said ambient light from said window, wherein said prism has multiple sides including an input side adapted to receive said ambient light, an output side adapted to output said light toward said reticle, a plurality of reflective sides adapted to internally reflect said light within said prism, and a diffusing side adapted to diffuse light within said prism such that said light is redirected toward said output side to illuminate the reticle, and
        a second light source positioned to emit light through the diffusing side of said prism to be incident upon the reticle.

16. The optical sight of claim 15, wherein the second light source comprises a tritium light source.

17. The optical sight of claim 15, wherein the optical train comprises
    an optically powered objective, and
    an optically powered eyepiece.

18. The optical sight of claim 15, wherein the optical train comprises
    an optically powered objective having at least one objective lens, and
    an optically powered eyepiece having at least one eyepiece lens.

19. An optical sight comprising:
    an optical train having an optical path therethrough, wherein the optical train comprises an optically powered objective having at least one objective lens, and an optically powered eyepiece having at least one eyepiece lens;

a reticle coincident with the optical path; and an unpowered reticle illumination source comprising a window adapted to transmit ambient light from an external environment to an interior of said optical sight, an optical filter positioned so that said ambient light from said window is incident upon the filter and the filter transmits filtered light of a desired color, a light-gathering prism that receives the filtered light, wherein said prism has multiple sides including an input side adapted to receive said filtered light, an output side adapted to output light toward said reticle, a plurality of reflective sides adapted to internally reflect said filtered light within said prism, and a diffusing side adapted to diffuse light within said prism such that said filtered light is redirected toward said output side to illuminate the reticle, and an unpowered tritium light source positioned to emit light through the diffusing side of said prism to be incident upon the reticle.

20. A light-gathering prism for illuminating a reticle comprising:

an input surface for receiving ambient light, an output surface for outputting said received light toward said reticle, a plurality of reflective surfaces adapted to internally reflect said received light such that said light is substantially confined within said prism until exiting through said output surface, and a diffusing surface adapted to redirect said received light toward said reticle.

21. The optical sight of claim 20, wherein said diffusing surface is also adapted to transmit light from an external light source toward said reticle.

* * * * *